US012681772B2

(12) United States Patent
Derbenwick Miller et al.

(10) Patent No.: US 12,681,772 B2
(45) Date of Patent: Jul. 14, 2026

(54) FUNDING-BASED MANAGEMENT OF CLOUD RESOURCES

(71) Applicant: Oracle International Corporation, Redwood Shores, CA (US)

(72) Inventors: Alison J. Derbenwick Miller, Castle Pines, CO (US); Pablo Selem, Bellevue, WA (US); Sowmya Bali, Redmond, WA (US); Yang Jiao, Irvine, CA (US); Manoj Krishna Ghosh, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 412 days.

(21) Appl. No.: 18/324,434

(22) Filed: May 26, 2023

(65) Prior Publication Data

US 2024/0095094 A1      Mar. 21, 2024

Related U.S. Application Data

(60) Provisional application No. 63/408,325, filed on Sep. 20, 2022.

(51) Int. Cl.
*G06F 9/50* (2006.01)
*G06F 11/34* (2006.01)

(52) U.S. Cl.
CPC .......... *G06F 9/5077* (2013.01); *G06F 9/5072* (2013.01); *G06F 11/3428* (2013.01)

(58) Field of Classification Search
CPC ... G06F 9/5077; G06F 9/5072; G06F 11/3428
See application file for complete search history.

(56) References Cited

U.S. PATENT DOCUMENTS

| | | | | |
|---|---|---|---|---|
| 2011/0313902 A1* | 12/2011 | Liu | ......................... | G06Q 30/04 |
| | | | | 705/34 |
| 2013/0304904 A1* | 11/2013 | Mouline | ............... | H04L 43/045 |
| | | | | 709/224 |
| 2015/0222723 A1* | 8/2015 | Adapalli | .............. | G06Q 10/067 |
| | | | | 705/26.41 |
| 2021/0157644 A1* | 5/2021 | Unnikrishnan | ....... | G06F 9/5072 |
| 2021/0160137 A1* | 5/2021 | Unnikrishnan | ..... | H04L 67/1036 |
| 2022/0382469 A1* | 12/2022 | Rath | ................... | G06F 11/3466 |
| 2023/0110786 A1* | 4/2023 | Aronovich | ............ | G06F 9/5044 |
| | | | | 718/105 |
| 2023/0308353 A1* | 9/2023 | Son | ......................... | H04L 47/83 |
| 2024/0289712 A1* | 8/2024 | Krishnaiah | ...... | G06Q 10/06375 |

* cited by examiner

*Primary Examiner* — Ryan Bertram
(74) *Attorney, Agent, or Firm* — Invoke

(57)      ABSTRACT

Systems and techniques for budget-based management of a cloud infrastructure are disclosed. A system monitors a cloud infrastructure for one or more trigger-action conditions associated with the cloud infrastructure. When a trigger-action condition is detected, the system determines a cloud infrastructure modification action that corresponds to the detected trigger condition. The system may apply the cloud infrastructure modification action to the cloud infrastructure. A cloud infrastructure modification action may modify one or more the workstation resources such that a rate of budget consumption is changed, for example, by pausing a resource, deleting a resource, resuming a paused resource, or changing from one resource to a different resource.

21 Claims, 8 Drawing Sheets

System 100

System 100

FUNDING-BASED MANAGEMENT OF CLOUD RESOURCES

INCORPORATION BY REFERENCE; DISCLAIMER

The following application is hereby incorporated by reference: application No. 63/408,325, filed Sep. 20, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure relates to budget-based management of cloud service resources. In particular, the present disclosure relates to monitoring a cloud-based infrastructure for budget-related trigger conditions and modifying resources in the cloud-based infrastructure responsive to the trigger conditions.

BACKGROUND

Cloud-based services provide a convenient, cost-effective, and secure way for a customer to configure and use computational resources without having to invest in and manage hardware and software within the customer organization. However, it can be difficult for the customer to understand how the operation of their cloud infrastructure consumes a budget. Consequently, it can be difficult to prevent cost overruns or unexpected shutdowns in the cloud service.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
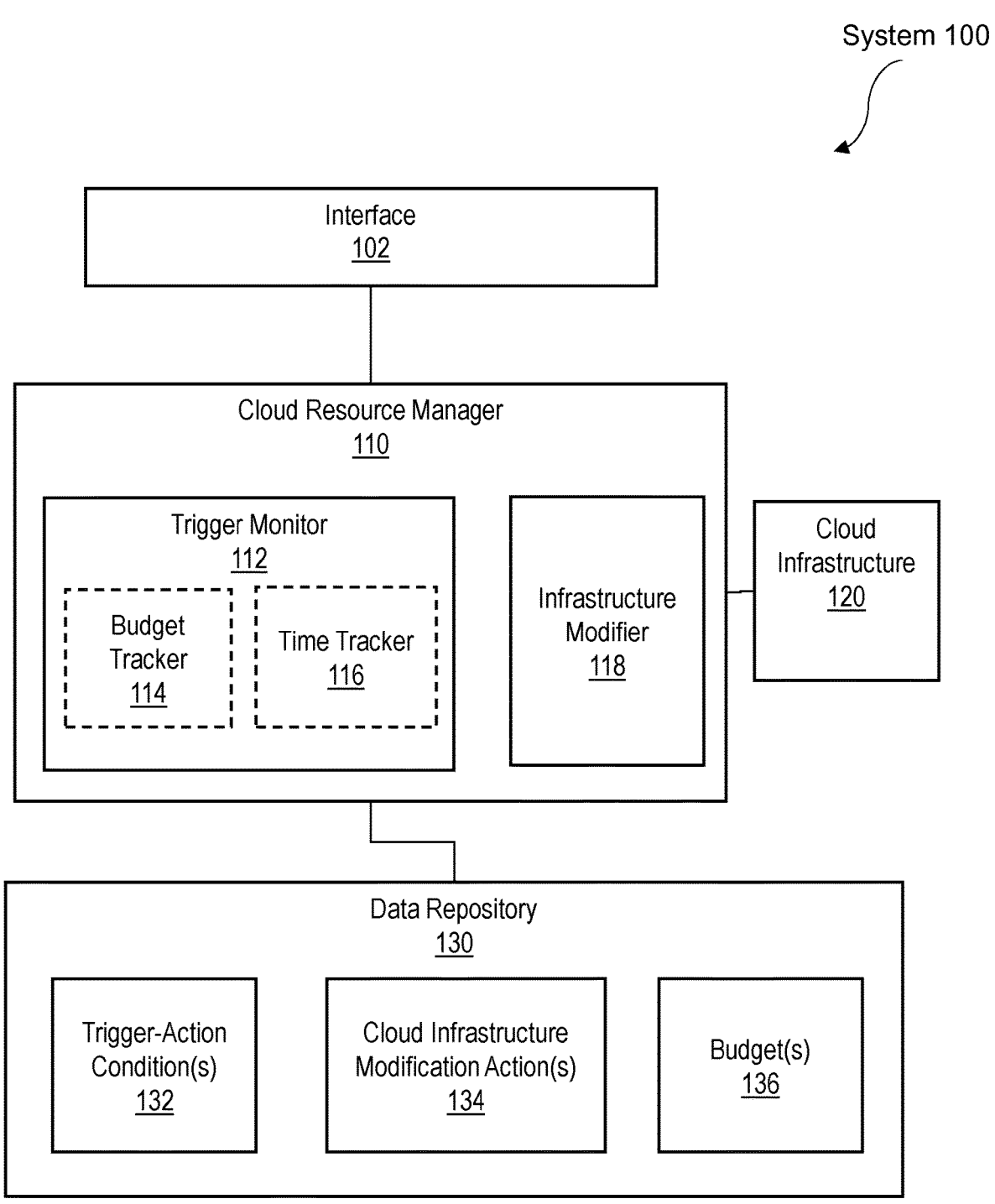
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. EXAMPLE CLOUD INFRASTRUCTURE
4. MANAGING CLOUD RESOURCES
5. EXAMPLE EMBODIMENT
6. PRACTICAL APPLICATIONS
7. COMPUTER NETWORKS AND CLOUD NETWORKS
8. HARDWARE OVERVIEW
9. MISCELLANEOUS; EXTENSIONS

1. GENERAL OVERVIEW

One or more embodiments perform a trigger-based modification of a cloud workstation. The trigger-based modification includes a modification action that is performed in response to detecting a trigger for the modification. In one embodiment, the system modifies at least two resources of different types of the cloud workstation in response to detection of a single triggering condition. As an example, the system may increase both compute and storage resources of a cloud workstation, of a cloud infrastructure, in response to detecting a single triggering condition. The system may switch from implementing a first stored configuration defining a first set of resources for the cloud infrastructure to a second stored configuration defining a second set of resources for the cloud infrastructure.

A system monitors a cloud infrastructure for one or more trigger conditions associated with the cloud infrastructure. The cloud infrastructure may include one or more virtual workstations, each of which includes a collection of cloud resources, such as compute resources, network resources, and storage resources, and software, that allows a customer to meet their computational needs. The cloud infrastructure may be associated with a budget and the cloud infrastructure incurs costs as it operates which consume the budget.

The trigger conditions may include budget-based trigger conditions, such as that a specified percentage of the budget has been consumed. The trigger conditions may include time-based trigger conditions, such as that a specified time period has elapsed, or that a specified time of day has occurred. When a trigger-action condition is detected, the system determines a cloud infrastructure modification action that corresponds to the detected trigger condition. The system may notify a user of the trigger condition. The system may apply the cloud infrastructure modification action to the cloud infrastructure. A cloud infrastructure modification action may modify one or more of the workstation resources such that the modification changes a rate of budget consumption. For example, the modification may include pausing a resource, deleting a resource, resuming a paused resource, or changing from one resource to a different resource.

One or more embodiments described in this Specification and/or recited in the claims may not be included in this General Overview section.

2. ARCHITECTURAL OVERVIEW

FIG. 1 illustrates a system 100 in accordance with one or more embodiments. As illustrated in FIG. 1, system 100 includes an interface 102, a cloud resource manager 110, a cloud infrastructure 120, and a data repository 130. In one or more embodiments, the cloud resource manager 110 may include one or more functional components such as a trigger monitor 112 and an infrastructure modifier 118.

In one or more embodiments, the cloud resource manager 110 refers to hardware and/or software configured to perform operations described herein for managing usage of the resources associated with a cloud infrastructure 120 to control budget consumption. Examples of operations for managing cloud resources are described below with reference to FIG. 3.

In one or more embodiments, the system 100 may include one or more cloud infrastructures 120. A cloud infrastructure 120 represents a set of hardware and software cloud resources assigned to a customer for their computational needs within a cloud service. An example of a cloud infrastructure 120 is described below with reference to FIG. 2. A cloud infrastructure 120 may be hosted by a cloud provider. The cloud provider may have a business relationship with a user or a user entity (hereinafter referred to as a user) where the user pays the cloud provider for the cloud infrastructure created by and for the user. The user may be an individual or an entity of the customer associated with the cloud infrastructure, e.g., an accounting department, or an IT administrator.

A cloud infrastructure 120 may be associated with one or more budgets 136. A budget 136 may include a specified amount of funds, credits, or other consumable quantity that is allocated for the operation of the cloud infrastructure 120. The budget 136 may be associated with an account for the customer where funds are deposited for use of the cloud service, or with an account that may be charged once the service has been used. The budget 136 may represent a total amount to be consumed for the duration of use of the cloud infrastructure. The budget 136 may represent an amount for a time period, e.g., $100 per month. The budget 136 may be renewable or increased, for example, when additional funds are allocated to an associated account.

When created by a user, a cloud infrastructure 120 may be associated with one or more trigger-action definitions. The trigger-action definitions may include trigger-action conditions 132 and one or more cloud infrastructure modification actions 134. A trigger-action condition 132 may specify a condition that, when met, causes the cloud manager 110 to initiate a cloud modification action 134. A trigger-action condition 132 may include, for example, that 10% of the budget 136 remains, that six months have elapsed since the cloud infrastructure 120 was launched, that a time of day has occurred, or that a budget 136 was renewed with additional funds.

A cloud infrastructure modification action 134 may define an action to be taken to modify the cloud infrastructure. The actions may be configured, for example, to reduce a rate of budget consumption, and/or to prevent spending more than the budget amount. Examples of cloud infrastructure modification actions 134 include deleting a resource in a cloud infrastructure 120, pausing a resource in a cloud infrastructure 120, resuming a paused resource in a cloud infrastructure 120, switching from implementing a first stored configuration defining a first set of resources for the cloud infrastructure 120 to a second stored configuration defining a second set of resources for the cloud infrastructure 120, or changing from one resource to another resource in a cloud infrastructure 120.

Returning to the cloud resource manager 110, a trigger monitor 112 may monitor one or more attributes of the cloud infrastructure 120 and its associated budget 136 for a trigger-action condition 132. The trigger monitor 112 may include one or more functional components, such as a budget tracker 114 and a time tracker 116. The budget tracker 114 may monitor a budget 136 associated with a cloud infrastructure 120 to determine what percentage of the budget 136 has been consumed or is remaining, or to determine a specified amount consumed or available. The budget tracker 114 may also track known future allocations of funds to a budget, for example, when a grant dispersal occurs at the same time each month. The time tracker 116 may monitor time-related conditions such as a total elapsed time for the cloud infrastructure 120, or a time of day. The trigger monitor 112 may determine whether a state of the budget 136 meets an associated trigger-action condition 132 and/or whether the time-related data meets an associated trigger-action condition 132. When a trigger-action condition 132 is met, the trigger monitor 112 may notify the infrastructure modifier 118.

The infrastructure modifier 118 may receive an indication from the trigger monitor 112 of which trigger-action condition 132 was met. Alternatively, the infrastructure modifier 119 may receive an indication of a cloud infrastructure modification action 134 that corresponds to the detected trigger-action condition 132. The infrastructure modifier 118 may be configured to modify the cloud infrastructure 120 according to the cloud infrastructure modification action 134 responsive to the detection of the trigger-action condition 132. Modifications may include, for example, pausing or resuming a resource, deleting a resource, instantiating a resource, or changing from one resource to another resource. Examples of cloud infrastructure modification action are discussed further below with respect to FIG. 4.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 7, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or executed on the same computing system as the cloud resource manager 110. Alternatively, or additionally, a data repository 130 may be implemented or executed on a computing system separate from the cloud resource manager 110. The data repository 130 may be communicatively coupled to the cloud resource manager 110 via a direct connection or via a network.

Information describing trigger-action conditions 132, cloud infrastructure modification actions 134 and budgets 136 may be implemented across any of components within the system 100. However, this information is illustrated within the data repository 130 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 102 refers to hardware and/or software configured to facilitate communications between a user and the system 100. Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

3. EXAMPLE CLOUD INFRASTRUCTURE

Figure 2:
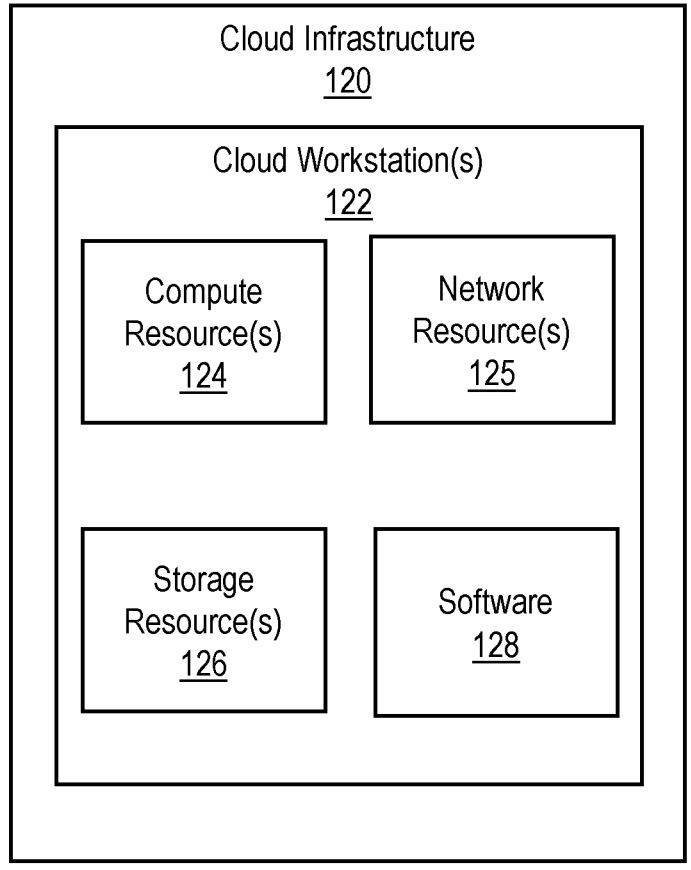
FIG. 2 illustrates an example of a cloud infrastructure in accordance with one or more embodiments.

FIG. 2 illustrates an example of a cloud infrastructure 120 in accordance with one or more embodiments. One or more components illustrated in FIG. 2 may be modified, rearranged, or omitted all together. Accordingly, the particular set of components illustrated in FIG. 2 should not be construed as limiting the scope of one or more embodiments.

A cloud infrastructure 120 may include one or more cloud workstations 122. A cloud workstation 122 comprises a set of resources that behave functionally as an individual computer. A cloud workstation 122 may include one or more compute resources 124. A compute resource 124 includes one or more processing components, memory, and any other processing resources provided by the cloud service to the user of the cloud workstation 122. The compute resources 124 may be reserved exclusively within the cloud service for the instance of the cloud workstation. Compute resources 124 may be paused and resumed with a cloud infrastructure modification action.

A cloud workstation 122 may include one or more network resources 125. The network resources 125 may include one or more communication channels and network software and hardware that the cloud workstation 122 may use to send or receive data from other cloud workstations, other cloud infrastructures, or other networks.

A cloud workstation 122 may include one or more storage resources 126. A storage resource 126 may include a dedicated amount of storage on a computer readable medium, for example, a 500 GB portion of a solid-state drive within the cloud service. Data used and generated by the compute resource(s) 124 may be stored in the storage resource 126. A storage resource 126 may reside on a computer readable medium shared by other cloud workstations and/or other cloud infrastructures. A storage resource 126 may be associated with a cost tier. Some storage resources may have a higher cost of use while providing advantages such as speed of access, security, frequent backups, or other benefits, while other storage resources may be associated with a second, lower cost tier and may provide fewer or lesser benefits compared to storage resources in a higher cost tier. A cloud infrastructure modification action may include moving data stored on the storage resource 126 to a storage resource in a different cost tier.

A cloud workstation 122 may include software 128. The software 128 may be selected or provided by the user to execute with the compute resource 124 to provide the functions needed by the user. Software 128 may include, for example, and without limitation, statistical software, image analysis software, data processing software, or scientific analysis software.

4. MANAGING CLOUD RESOURCES

Figure 3:
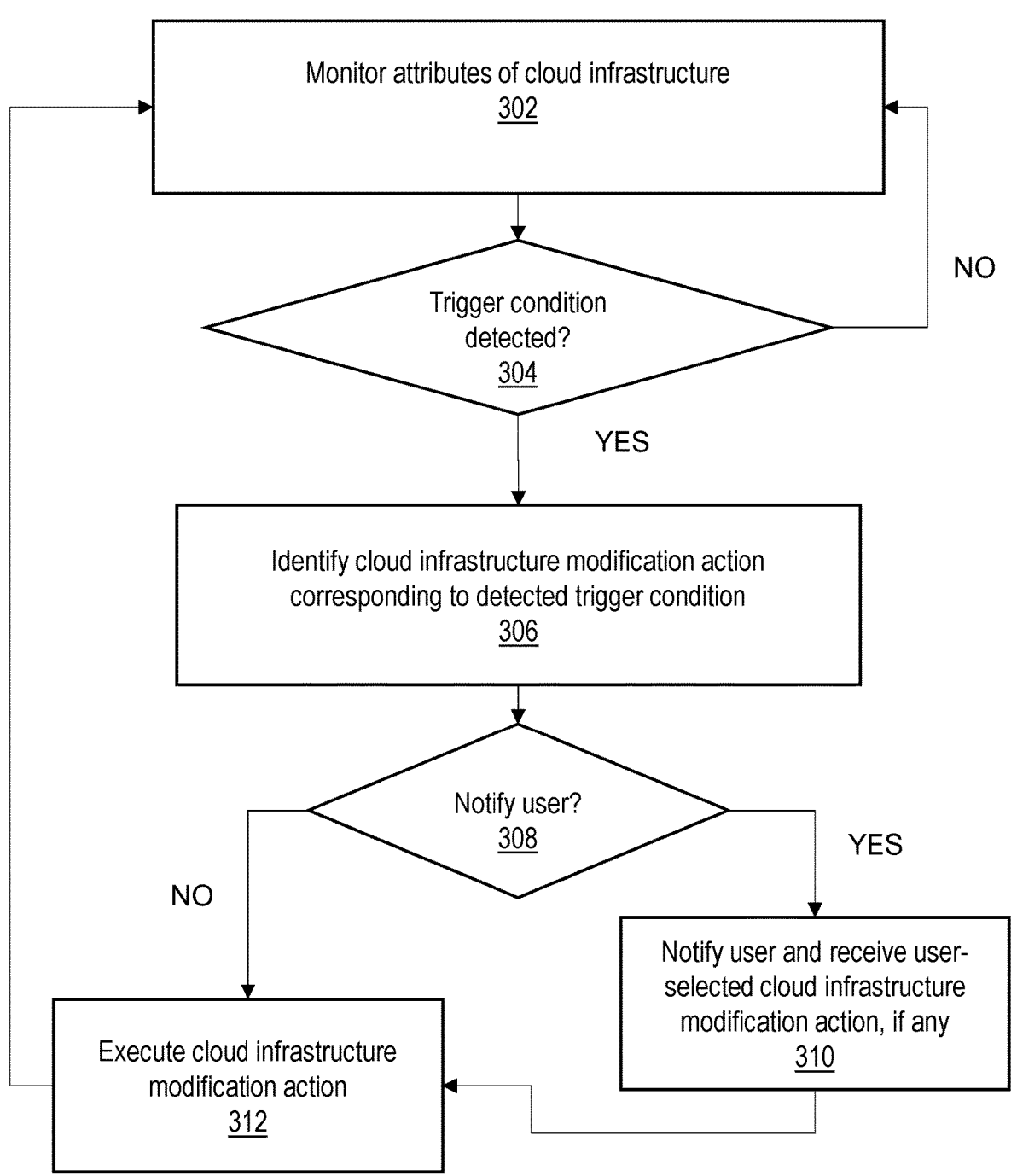
FIG. 3 illustrates an example set of operations for managing cloud resources in accordance with one or more embodiments.

FIG. 3 illustrates an example set of operations for managing cloud resources in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In one or more embodiments, the trigger monitor 112 monitors attributes of a cloud infrastructure (Operation 302). The trigger monitor 112 may monitor one or more conditions of the cloud infrastructure 120 and its associated budget 136 for a trigger-action condition 132. The trigger monitor 112 may monitor a budget 136 associated with a cloud infrastructure 120 to determine what percentage of the budget 136 has been consumed or is remaining. The trigger monitor 112 may monitor time-related conditions such as a total elapsed time for the cloud infrastructure 120, or a time of day.

In one or more embodiments, the trigger monitor 112 determines whether a trigger-action condition is detected (Operation 304). The trigger monitor 112 may determine whether a state of the budget 136 meets a modification criterion of an associated trigger-action condition 132. For example, a trigger-action condition 132 may be that a specified percentage of the budget associated with the cloud infrastructure has been consumed, e.g., 90%, 95%, or 100%. In another example, a trigger-action condition 132 may be that the budget associated with the cloud infrastructure has been increased or replenished, such that the percentage of the budget that has been consumed is decreased, e.g., to 0%, 10%, or 50%. The trigger monitor 112 may determine whether the time-related data meets an associated trigger-action condition 132. For example, a trigger-action condition 132 may be that a specified amount of time has elapsed since the deployment of the cloud infrastructure, e.g., 3 months, 6 months, or 12 months. In another example, a trigger-action condition 132 may be that a specified time of day has occurred, e.g., 5 p.m., 9 a.m., or midnight. When no trigger-action condition is detected, the trigger monitor 112 continues to monitor attributes of the cloud infrastructure at Operation 302.

In one or more embodiments, when a trigger-action condition is detected, the trigger monitor 112 or the infrastructure modifier 114 identifies a cloud infrastructure modification action that corresponds to the detected trigger-action condition (Operation 306). A cloud infrastructure modification action 134 may be associated with, linked from, or otherwise connected to a trigger-action condition 132. For example, a look-up table may identify a cloud infrastructure modification action 134 for a trigger-action condition 132 table entry. In another example, a database may include a table for trigger-action conditions and another table for cloud infrastructure modification actions, and may include a reference or link between a trigger-action condition entry and one or more cloud infrastructure modification actions.

In one or more embodiments, the infrastructure modifier 114 determines whether a user should be notified (Operation 308). In some instances, a trigger-action condition 132 may be associated with a user notification action in addition to a corresponding cloud infrastructure modification action 134. In some instances, a cloud infrastructure modification action 134 may include a user notification action. In still other instances, a cloud infrastructure modification action 134 may not have any corresponding user notification action.

In one or more embodiments, when the cloud infrastructure modification action 134 includes or corresponds to a user notification action, the infrastructure modifier 114 notifies the user and may receive a user-selected cloud infrastructure modification action (Operation 310). A notification may include information that conveys that a trigger-action condition has been met. A notification may further include information that conveys which cloud infrastructure modification action will be performed in response to the detected trigger-action condition.

A notification may also include an interactive component. In one or more embodiments, the interactive component may allow the receiving user to accept or decline execution of the cloud infrastructure modification action. In one or more embodiments, the interactive component may present alternative cloud infrastructure modification actions that may be taken, and/or may otherwise allow the receiving user to select a different cloud infrastructure modification action to take.

Notifying the user may include, for example, generating and sending an email message to the user; generating and sending an SMS message to the user; initiating a telephone call to the to the user; or any other method or technique of informing the user that a trigger-action condition has been met. The interactive components may include, in an example, a hyperlink to an interface that allows the user to accept, decline, or modify the cloud infrastructure modification action. In another example, the interactive component may include a pop-up menu with elements that allow the user to accept, decline, or modify the cloud infrastructure modification action. In another example, the interactive component may include telephone keypad and/or interactive voice response selectable options.

In one or more embodiments, the infrastructure modifier 114 executes the cloud infrastructure modification action (Operation 312). The cloud infrastructure modification action may be the one identified in Operation 306 or one selected by the user in Operation 310. Examples of cloud infrastructure modification actions 134 include deleting a resource in a cloud infrastructure 120, pausing a resource in a cloud infrastructure 120, resuming a paused resource in a cloud infrastructure 120, or changing from one resource to another resource in a cloud infrastructure 120.

The infrastructure modifier 114 may delete one or resources, such as a workstation and all of its associated resources. This may be responsive, for example, to a trigger-action condition of 100% budget consumption, or responsive to an elapsed time, e.g., 12 months from the start of the cloud infrastructure. Deleting the resources may include erasing any user-provided software and data from storage resources, and making any deleted network, compute, and storage resources available for assignment to another cloud infrastructure. In another example, if the workstation includes a virtual machine (VM) associated with at least some of the network, compute and storage resources of the workstation, the infrastructure modifier 114 may delete the VM. This may be responsive, for example, to a trigger-action condition of a time of day, e.g., 5:30 p.m., after a set time from the instantiation of the VM, or another time at the end of a workday.

The infrastructure modifier 114 may pause or resume one or more resources. This may be responsive, for example, to a trigger-action condition of 95% or 100% budget consumption, or responsive a time of day, e.g., 8 a.m., 5:30 p.m. The infrastructure modifier 114 may pause resources, for example, by suspending any operations by a compute resource, preventing transmission of data by a network resource, and/or preventing read or write operations to a storage resource. When resources are paused, some portion of the budget may still be consumed while the resource is paused but at a lower rate than when the resources are active. The resources are still reserved for the use of the cloud infrastructure.

The infrastructure modifier 114 may resume a paused resource responsive to a trigger-action condition of a time of day, or to the budget being replenished or increased. The infrastructure modifier 114 may resume a paused resource by allowing a compute resource to resume operations, allowing a network resource to transmit data, and/or by allowing access to a storage resource. Pausing and resuming resources may allow a user to reduce budget consumption while the cloud infrastructure is not being used, or if the budget is almost consumed, while still preserving the user's data, states of operations, and other conditions of a cloud workstation that might not be restorable if the resources were deleted.

The infrastructure modifier 114 may change from one resource to another resource. This may be responsive, for example, to a trigger-action condition specifying an elapsed time, e.g., 6 months from the start of the cloud infrastructure, or a condition that 5% of the budget remains. For example, the infrastructure modifier 114 may copy the data and any accompanying data structures from a higher cost storage resource to a lower cost storage resource and then delete the data from the higher cost storage resource. The infrastructure modifier 114 may also configure the other cloud workstation resources to be able to read to and write from the second storage resource. For example, the infrastructure modifier 114 may update a link or address used by the cloud workstation resources to correctly reflect the second storage resource.

The infrastructure modifier 114 may instantiate one or more resources. This may be responsive, for example, to a trigger-action condition that indicates that a depleted budget has been replenished. The infrastructure modifier 114 may create a new cloud workstation instance with associated newly added compute, network, and storage resources. The infrastructure modifier 114 may further install and configure the user's software into the workstation as indicated by a cloud infrastructure architecture.

The infrastructure modifier 114 may switch from implementing a first stored configuration defining a first set of resources for the cloud infrastructure 120 to a second stored configuration defining a second set of resources for the cloud infrastructure 120. For example, prior to switching, the infrastructure modifier 114 may create a new cloud workstation instance with associated newly added compute, network, and storage resources, and may install and configure the user's software into the workstation as indicated by a cloud infrastructure architecture. The newly added resources may differ in configuration from the resources of the first configuration. For example, the second configuration may include a different number or type of compute resources, a faster or slower network resource, and/or a different storage resource tier. Data from the first configuration may be copied or otherwise transferred to the new storage resource. The second configuration may be associated with a different cost and/or rate of budget consumption than the first configuration. The first configuration in use may then be deleted.

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
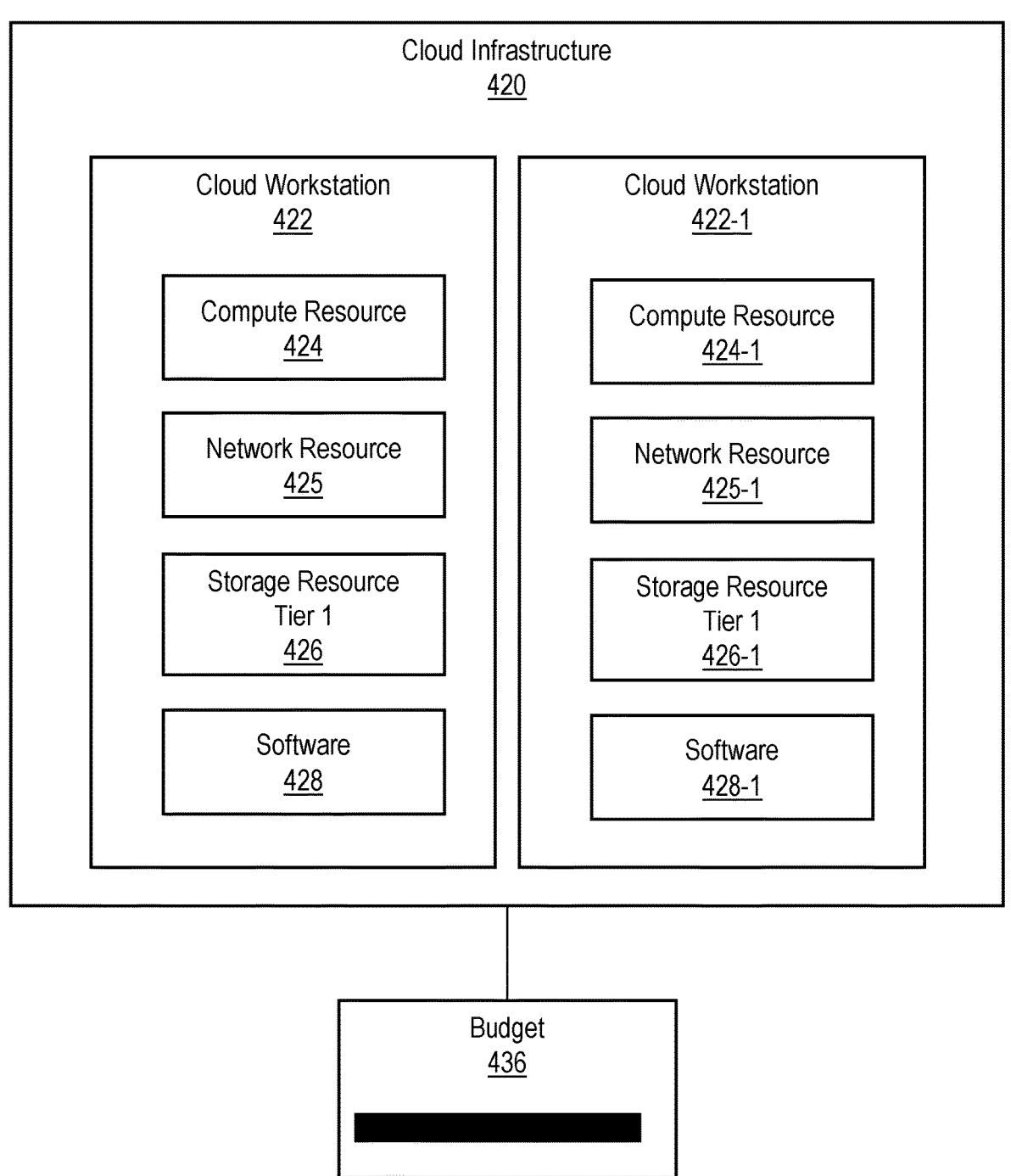
FIGS. 4A-D illustrate an example of managing cloud resources in response to receiving trigger conditions.

FIGS. 4A-D illustrate an example of a cloud infrastructure 420 and changes thereto as the cloud resource manager 110 monitors the cloud infrastructure 420. As shown in FIG. 4A, the cloud infrastructure 420 includes two cloud workstations 422 and 422-1. Cloud workstation 422 includes a compute resource 424, a network resource 425, a storage resource 426, and software 428. Cloud workstation 422-1 includes a compute resource 424-1, a network resource 425-1, a storage resource 426-1, and software 428-1. The cloud infrastructure 420 is associated with a budget 436, which is shown at 100% unconsumed.

Figure 4B:
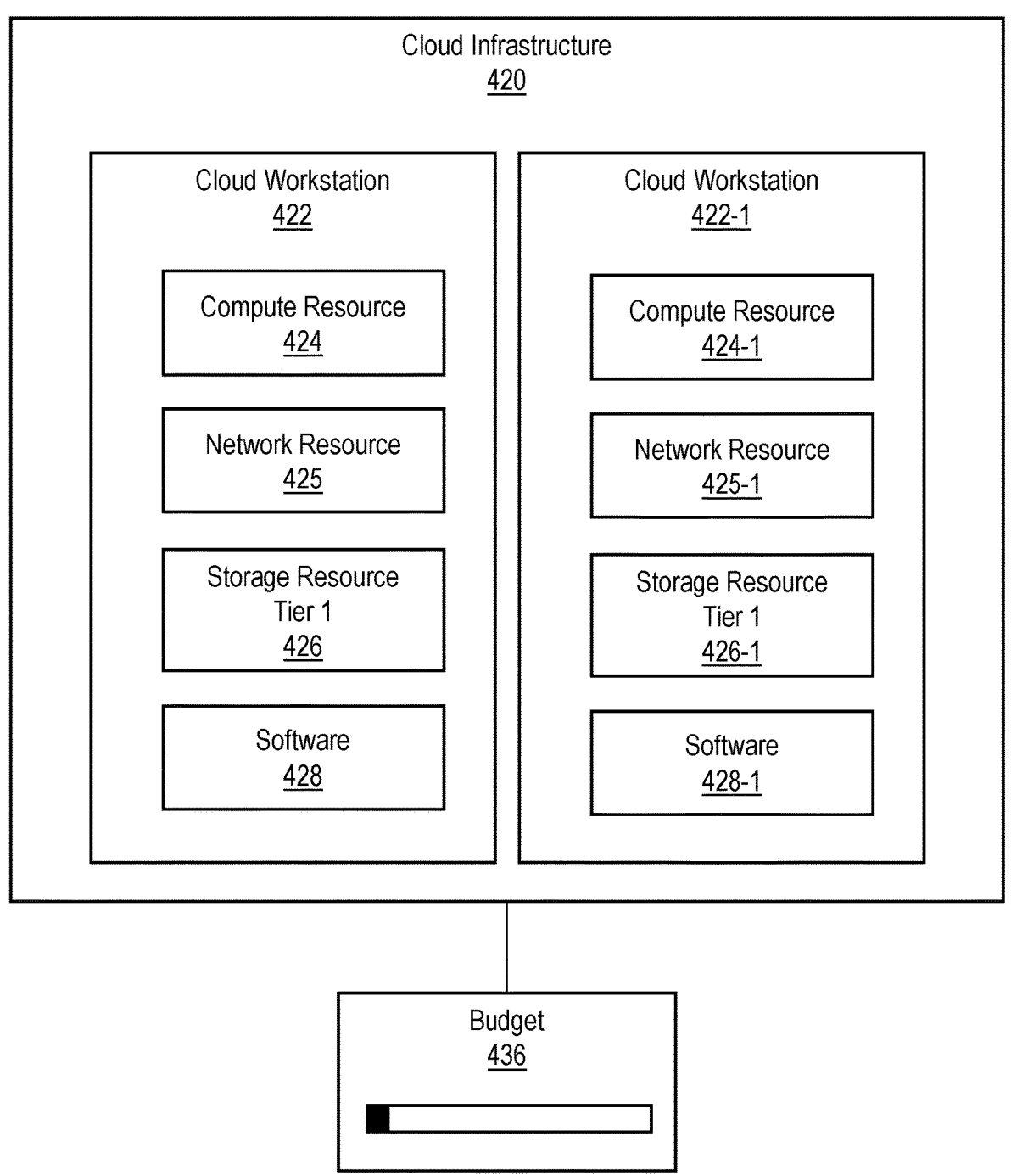
Figure 4C:
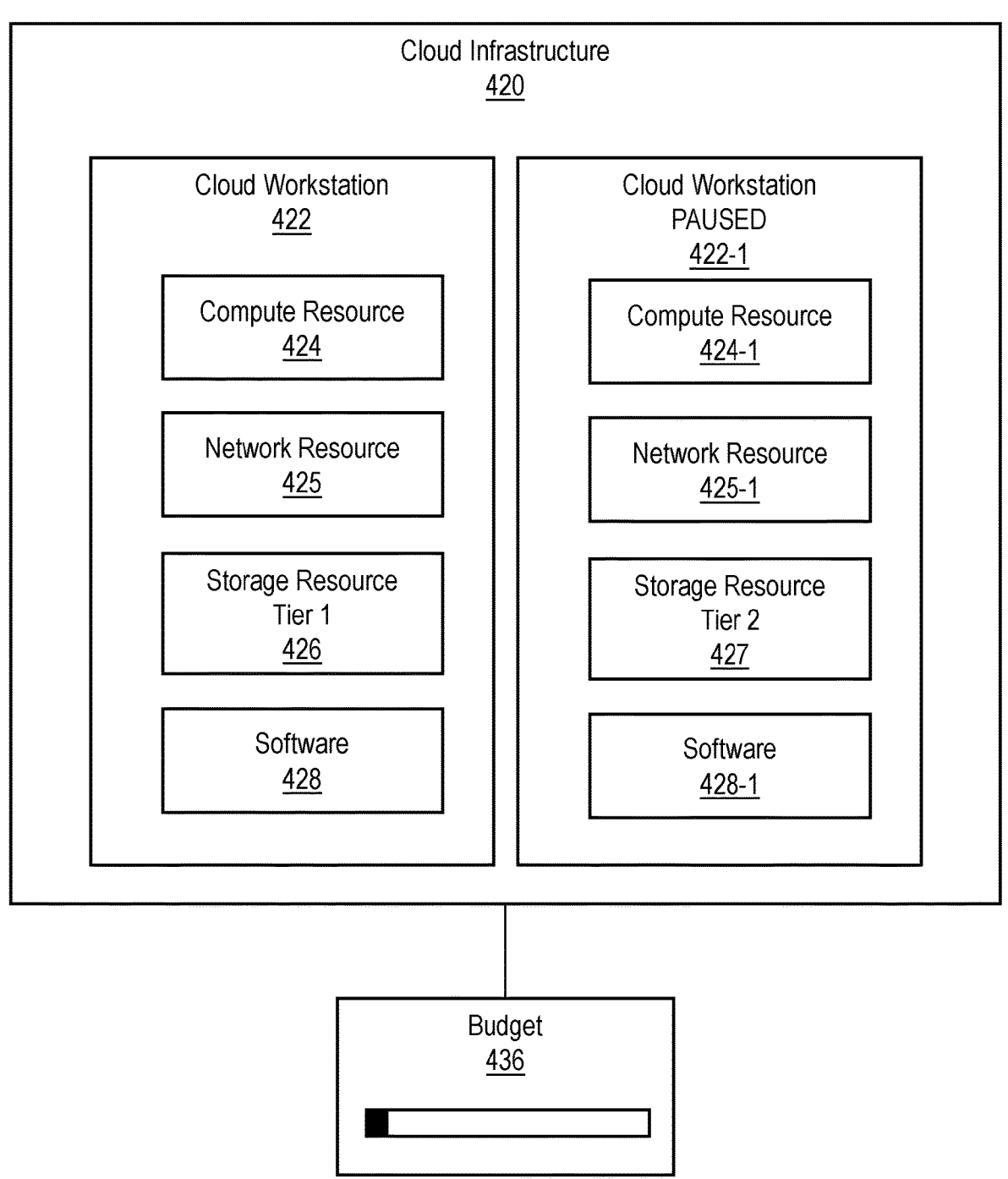

In FIG. 4B, the budget 436 is 90% consumed, which may be associated with a trigger-action condition for the cloud infrastructure 420. In FIG. 4C, the trigger-action condition of 90% budget consumption corresponds to a cloud infrastructure modification action that modifies two different resource types. For example, the cloud infrastructure modification action may include changing the storage resource to a lower cost storage tier and pausing the compute resource of a workstation. Accordingly, cloud workstation 422-1 is paused, and its storage resource is changed from storage resource 426-1 to storage resource 427. This scenario may correspond to a situation where researchers are using the cloud infrastructure to collect and analyze data. Cloud workstation 422-1 may be performing lower priority operations and may be selected by the user to be paused to better preserve remaining budget for the higher priority cloud workstation 422.

Figure 4D:
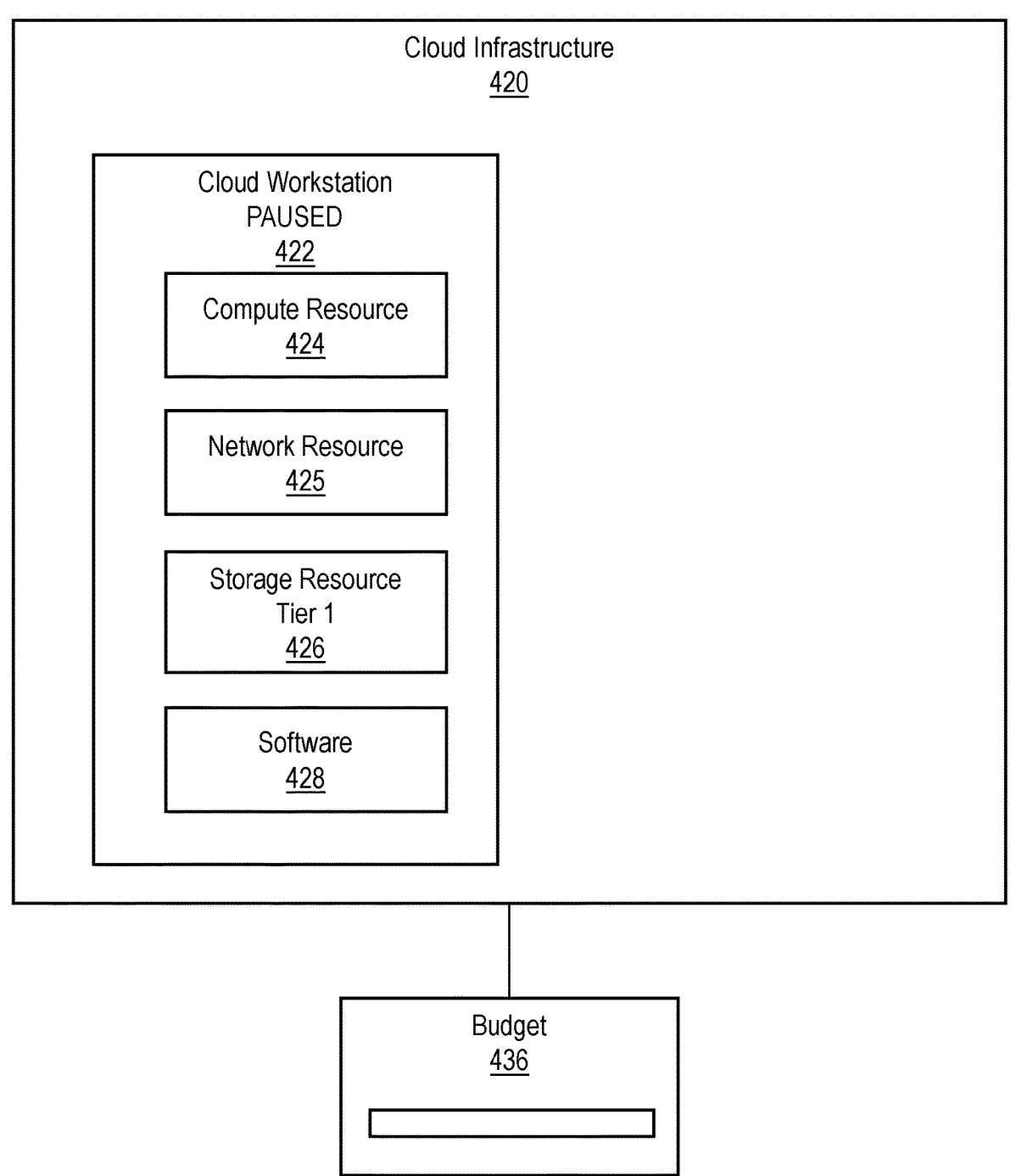

In FIG. 4D, the budget 436 is 100% consumed. Responsive to a corresponding trigger-action condition, the infrastructure modifier 114 may delete cloud workstation 422-1 entirely and may pause cloud workstation 422. While this state may still accrue costs to the user, the cloud service provider may allow the user to continue, for example, with a pay-as-you-go model.

6. PRACTICAL APPLICATIONS

Many clients of cloud service providers use the cloud service, at least in part, because the cloud service is a more cost-effective way to access infrastructure resources and expertise than having to provision and manage a version of the client's cloud infrastructure in-house. However, in sce-narios where the use of the cloud service is not consistent over the life of the infrastructure, the client may not realize that their budget is still being consumed even while the client is not interacting with their cloud infrastructure. For example, in research scenarios, the cloud infrastructure may be heavily used while data is gathered and analyzed, and then used very little, or not at all, while, for example, the researcher is preparing a publication, waiting for peer review, and so forth. Clients having cloud infrastructures that are used more consistently may still wish to automatically control the rate at which their cloud infrastructure consumes their budget to maximize the use of the cloud infrastructure.

In one or more embodiments, accordingly, a user may configure budget-based conditions to watch for in their cloud infrastructure and may also configure automated modifications to make based on those detected conditions. Further, the user may allow, deny, or change the modifications applied when a trigger-action condition occurs. The one or more embodiments therefore relieve the user from having to manage and modify how their cloud architecture consumes their budget while also giving the user more real-time control over how their budget is consumed.

7. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
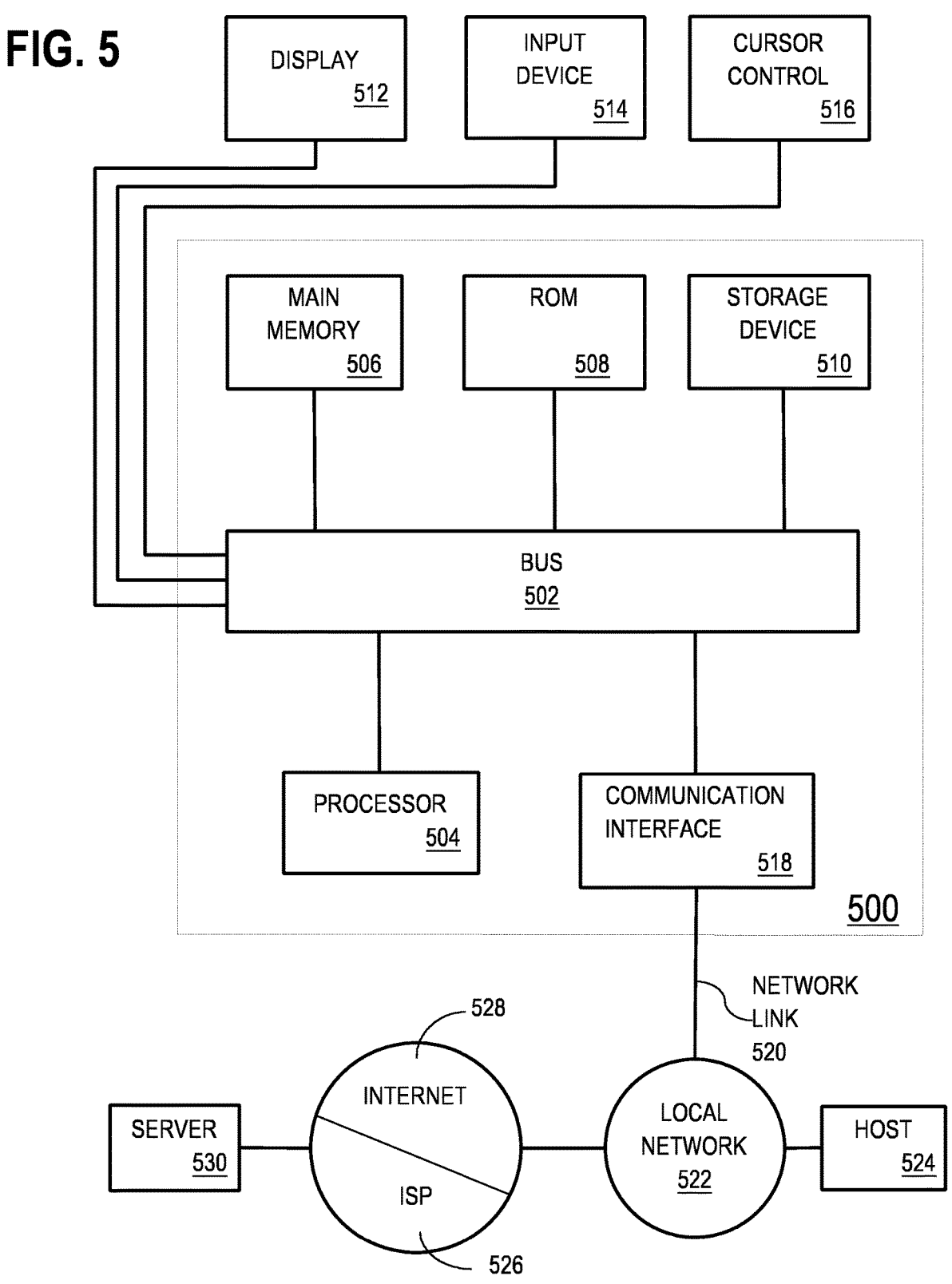
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

identifying a cloud infrastructure hosted by a cloud provider, the cloud infrastructure comprising a cloud workstation, the cloud workstation including at least two resources of different types including a compute resource;

receiving a first trigger-action definition comprising a first trigger condition and a first cloud infrastructure modification action to be executed in response to detecting the first trigger condition, the first cloud infrastructure modification action comprising a modification to each of the at least two resources of different types included in the cloud workstation;

storing the first trigger-action definition in association with the cloud infrastructure;

monitoring attributes of the cloud infrastructure to detect the first trigger condition; and responsive to detecting the first trigger condition, executing the first cloud infrastructure modification action to modify each of the at least two resources of different types included in the cloud workstation, wherein the first cloud infrastructure modification action comprises switching from (a) a first configuration for the cloud infrastructure that defines a first set of resources of two or more different types of resources to (b) a second configuration for the cloud infrastructure that defines a second set of resources of two or more different types of resources.

2. The non-transitory computer readable media of claim 1, wherein the at least two resources of different types further comprise:

at least one of a network resource or a storage resource.

3. The non-transitory computer readable media of claim 1, wherein both the first configuration and the second configuration are determined prior to detection of the first trigger condition.

4. The non-transitory computer readable media of claim 1, further comprising:

detecting a second trigger condition associated with a second trigger-action definition and a second cloud infrastructure modification action; and responsive to detecting the second trigger condition, executing the second cloud infrastructure modification action to modify each of the at least two resources of different types included in the cloud workstation, wherein executing the second cloud infrastructure modification action comprises:

adding the at least two resources to the cloud infrastructure; and installing customer-selected software configured for using the at least two resources in the cloud infrastructure.

5. The non-transitory computer readable media of claim 1, wherein detecting the first trigger-action condition comprises detecting usage of particular portion of funds in a budget.

6. The non-transitory computer readable media of claim 1, wherein detecting the first trigger-action condition comprises determining that available funds in a budget meet a modification criterion.

7. The non-transitory computer readable media of claim 1, wherein executing the first cloud infrastructure modification action is further responsive to user input approving the first cloud infrastructure modification action.

8. The non-transitory computer readable media of claim 1, further comprising receiving a user modification of the first cloud infrastructure modification action prior to execution.

9. The non-transitory computer readable media of claim 1, wherein detecting the first trigger condition comprises detecting a future allocation of funds to a budget.

10. The non-transitory computer readable media of claim 1, wherein detecting the first trigger condition comprises detecting an elapsed time.

11. The non-transitory computer readable media of claim 1, further comprising:

detecting a second trigger condition associated with a second trigger-action definition and a second cloud infrastructure modification action; and responsive to detecting the second trigger condition, executing the second cloud infrastructure modification action to modify each of the at least two resources of different types included in the cloud workstation, wherein executing the second cloud infrastructure modification action comprises transferring stored data from a first storage tier associated with a first cost to a second storage tier associated with a second cost.

12. The non-transitory computer readable media of claim 1, further comprising:

detecting a second trigger condition associated with a second trigger-action definition and a second cloud infrastructure modification action; and responsive to detecting the second trigger condition, executing the second cloud infrastructure modification action to modify each of the at least two resources of different types included in the cloud workstation, wherein executing the second cloud infrastructure modification action comprises terminating the cloud workstation.

13. The non-transitory computer readable media of claim 1, further comprising:

detecting a second trigger condition associated with a second trigger-action definition and a second cloud infrastructure modification action; and responsive to detecting the second trigger condition, executing the second cloud infrastructure modification action to modify each of the at least two resources of different types included in the cloud workstation, wherein executing the second cloud infrastructure modification action comprises pausing at least one of the at least two resources.

14. The non-transitory computer readable media of claim 1, further comprising:

detecting a second trigger condition associated with a second trigger-action definition and a second cloud infrastructure modification action; and responsive to detecting the second trigger condition, executing the second cloud infrastructure modification action to modify each of the at least two resources of different types included in the cloud workstation, wherein executing the second cloud infrastructure modification action comprises terminating a compute resource.

15. The non-transitory computer readable media of claim 1, wherein the trigger condition defines a scheduled time for the first cloud infrastructure modification action.

16. A method comprising:

identifying a cloud infrastructure hosted by a cloud provider, the cloud infrastructure comprising a cloud workstation, the cloud workstation including at least two resources of different types including a compute resource;

receiving a first trigger-action definition comprising a first trigger condition and a first cloud infrastructure modification action to be executed in response to detecting the first trigger condition, the first cloud infrastructure modification action comprising a modification to each of the at least two resources of different types included in the cloud workstation;

storing the first trigger-action definition in association with the cloud infrastructure;

monitoring attributes of the cloud infrastructure to detect the first trigger condition; and responsive to detecting the first trigger condition, executing the first cloud infrastructure modification action to modify each of the at least two resources of different types included in the cloud workstation, wherein the first cloud infrastructure modification action comprises switching from (a) a first configuration for the cloud infrastructure that defines a first set of resources of two or more different types of resources to (b) a second configuration for the cloud infrastructure that defines a second set of resources of two or more different types of resources;

wherein the method is performed by at least one device including a hardware processor.

17. The method of claim 16, further comprising:

detecting a second trigger condition associated with a second trigger-action definition and a second cloud infrastructure modification action; and responsive to detecting the second trigger condition, executing the second cloud infrastructure modification action to modify each of the at least two resources of different types included in the cloud workstation, wherein executing the second cloud infrastructure modification action comprises transferring stored data from a first storage tier associated with a first cost to a second storage tier associated with a second cost.

18. The method of claim 16, wherein detecting the first trigger condition comprises detecting at least one of availability of funds in a budget or detecting usage of particular portion of funds in a budget.

19. The method of claim 16, further comprising:

detecting a second trigger condition associated with a second trigger-action definition and a second cloud infrastructure modification action; and responsive to detecting the second trigger condition, executing the second cloud infrastructure modification action to modify each of the at least two resources of different types included in the cloud workstation, wherein executing the second cloud infrastructure modification action comprises at least one of: pausing at least one of the at least two resources; terminating a compute resource; or terminating the cloud workstation.

20. A system comprising:

one or more hardware processors;

one or more non-transitory computer-readable media; and program instructions stored on the one or more non-transitory computer-readable media that, when executed by the one or more hardware processors, cause the system to perform operations comprising:

identifying a cloud infrastructure hosted by a cloud provider, the cloud infrastructure comprising a cloud workstation, the cloud workstation including at least two resources of different types including a compute resource;

receiving a first trigger-action definition comprising a first trigger condition and a first cloud infrastructure modification action to be executed in response to detecting the first trigger condition, the first cloud infrastructure modification action comprising a modification to each of the at least two resources of different types included in the cloud workstation;

storing the first trigger-action definition in association with the cloud infrastructure;

monitoring attributes of the cloud infrastructure to detect the first trigger condition; and

responsive to detecting the first trigger condition, execut-
ing the first cloud infrastructure modification action to
modify each of the at least two resources of different
types included in the cloud workstation, wherein the
first cloud infrastructure modification action comprises
switching from (a) a first configuration for the cloud
infrastructure that defines a first set of resources of two
or more different types of resources to (b) a second
configuration for the cloud infrastructure that defines a
second set of resources of two or more different types
of resources.

21. The non-transitory computer readable media of claim
1, wherein the detection of the first trigger condition is
sufficient for triggering the execution of the first cloud
infrastructure modification action, without other trigger con-
ditions, to modify each of the at least two resources of
different types included in the cloud workstation.

* * * * *